G. O. HUTSON.
Gate Post.
No. 50,005.
Patented Sept. 19, 1865.
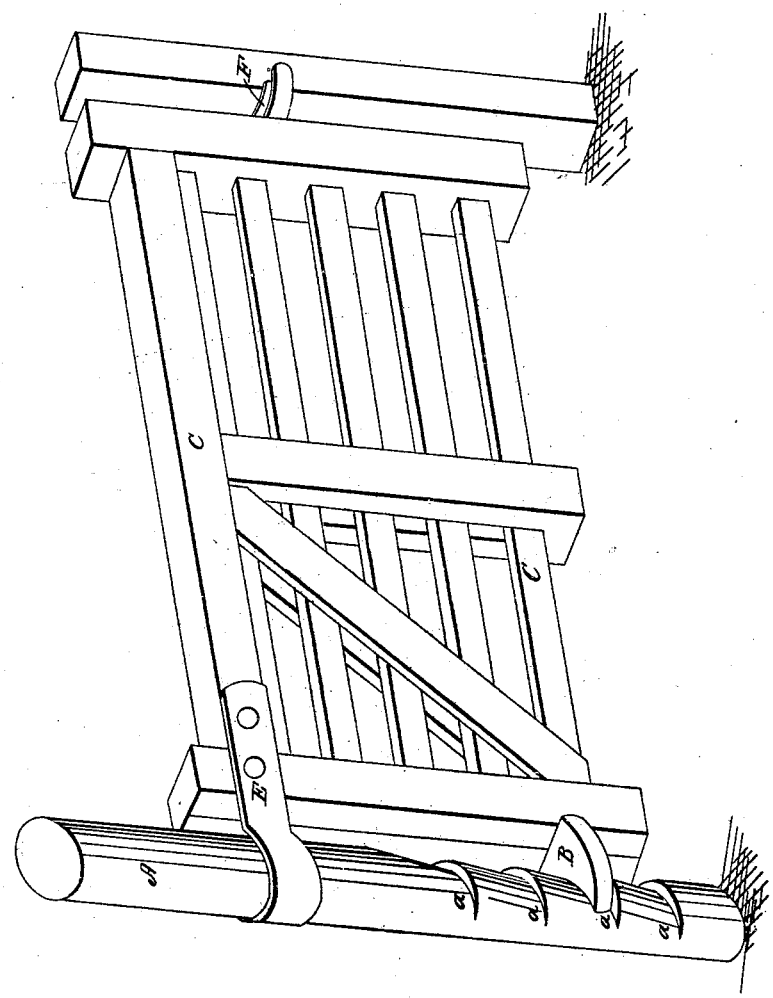

UNITED STATES PATENT OFFICE.

G. O. HUTSON, OF IOWA CITY, IOWA.

IMPROVEMENT IN GATE-POSTS.

Specification forming part of Letters Patent No. 50,005, dated September 19, 1865.

*To all whom it may concern:*

Be it known that I, G. O. HUTSON, of the city, county, and State of Iowa, have invented new and useful Improvements in Gate-Posts, and in the method of hanging gates thereon; and I do hereby declare the following to be a full, clear, and exact description of the nature, construction, and operation of the same, sufficient to enable one skilled in the art to construct and use the same, reference being had to the accompanying drawing, which is made part of this specification, and which is a perspective view of my improvement.

The invention consists in making a series of shoulders upon the post and in providing a bearer to the heel of the gate-frame, which may rest upon either of said shoulders, while the upper part of the gate is supported by a strap which encircles the gate-post and moves freely thereon with the vertical or swinging motions of the gate.

A is the gate-post, which has a series of depressions, $a\ a$, which cause the lower portion of one side of the post to assume the appearance of a series of inverted conical frusta, the upturned bases $b$ of which form shoulders, on which may rest the bearer D, which is attached to the lower portion of the gate, as shown in the figure.

To the upper portion of the gate is attached a strap, E, which passes around the upper or cylindrical portion of the gate-post and moves freely thereon as the gate is moved.

The object of the invention is to enable the gate to be raised in case of snow or snow-drifts, which may impede the opening of the same, and enable it to revolve at a higher level, so as to clear the incumbrance. It is also useful in parting stock, such as hogs, sheep, and calves, from cattle or horses, and pigs from hogs, and in other ways which might be specified were it necessary to enter more fully into that branch of the subject.

The operation of the improvement consists in lifting the gate until the bearer D shall rest upon such one of the shoulders $b$ as shall enable it to revolve at the desired height from the ground, the strap moving freely either vertically, as the gate may be adjusted in the manner described, or in slipping in a horizontal plane as the gate swings open or shut.

Although I prefer the method shown and described of making the notches on the post, as the gate is so easily raised, slipping against the sides of the conical incline, yet the same purpose may be attained in a manner probably less convenient in point of facility of adjustment by making grooves in the post of such contour as to be fitted by the contacting portion of the bearer D, and the notches or shoulders may be at such relative distances apart as may be convenient.

Any convenient arrangement of latch adapted to the changing vertical position of the gate may be adopted.

Having described my invention, what I claim therein, and desire to secure by Letters Patent, is—

The combination of the gate-post provided with shoulders or grooves, the bearer attached to the lower portion of the gate, and the band which forms the upper support, substantially as described and represented.

G. O. HUTSON.

Witnesses:
COLUMBUS FURNAS,
I. L. BAUSMAN.